Nov. 25, 1952 — W. I. BELDEN — 2,619,211

FLEXIBLE PIN CLUTCH

Filed April 27, 1946 — 2 SHEETS—SHEET 1

INVENTOR
WAYNE I. BELDEN
By Harry R. Canfield
ATTORNEY

Nov. 25, 1952 — W. I. BELDEN — 2,619,211
FLEXIBLE PIN CLUTCH
Filed April 27, 1946 — 2 SHEETS—SHEET 2

INVENTOR
WAYNE I. BELDEN
By Harry R. Canfield
ATTORNEY

Patented Nov. 25, 1952

2,619,211

UNITED STATES PATENT OFFICE 2,619,211

FLEXIBLE PIN CLUTCH

Wayne I. Belden, Westfield, N. Y., assignor to Ajax Flexible Coupling Co. Inc., Westfield, N. Y., a corporation of New York Application April 27, 1946, Serial No. 665,525

7 Claims. (Cl. 192—67)

This invention relates to couplings, by which a pair of shafts or other rotary elements are yieldably coupled together.

Such couplings comprise, in general, a pair of flanges secured to the shafts, or the like to be coupled; and yieldable or cushioning bushings in the flanges axially aligned in pairs in the respective flanges; and coupling pins in and bridging the aligned pairs of bushings.

Such couplings are usually made as a unit and installed by securing the two flanges respectively to the shafts to be coupled, usually by bored hubs on the respective flanges telescoped over the shafts.

As the use of such couplings has developed, it has become desirable to be able from time to time to uncouple one shaft or the like from the other and to re-couple them again, without disturbing the yielding action afforded by the yieldable bushings; and without having to move the coupled shafts or the driving and driven apparatus to which they are respectively connected; and a problem is thus presented, which is made difficult of solution because of the fact that the confronting ends of the coupled shafts are usually close together (as indicated in Fig. 1) and the coupling as a unit is usually telescoped over both of them when secured to them; and because of the further fact that in a coupling of considerable horsepower transmitting size, there is a multiplicity of pins and a corresponding multiplicity of pairs of bushings with which the pins cooperate.

It is to solve this problem that the present invention has been made and accordingly the objects of the invention are:

To provide generally a coupling of the class referred to, the coupled parts of which may be quickly and easily uncoupled and recoupled;

To provide such a coupling the operative elements of which are positively retained in coupled or uncoupled condition, by a device of the quick-detachable type;

To provide a coupling of the class referred to comprising a multiplicity of pairs of bushings coupled by a corresponding multiplicity of coupling pins, and which may be uncoupled and recoupled by uncoupling and coupling movements of all of the pins in unison;

To provide a coupling of the class referred to in which the coupling pins are all connected to a common element whereby they may be moved into or removed from coupling position in unison by movement of the one common element;

To provide a coupling of the class referred to in which the coupling pins are connected to a common element for coupling and uncoupling purposes, in a manner to permit compensating alignment of the pins with the coupling bushings when the coupled shafts or the like, and therefore the bushings, are out of alignment due to misalignment of the coupled shafts.

Other objects will be apparent to those skilled in the art to which the invention appertains.

The invention is fully disclosed in the following description taken in connection with the accompanying drawing, in which.

Figure 1:
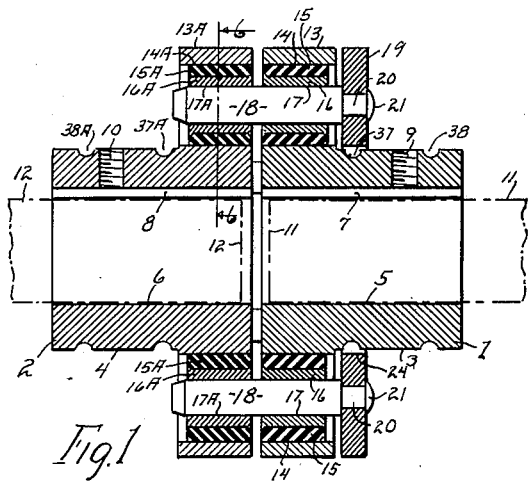
Fig. 1 is a longitudinal sectional view of a two-part coupling device embodying the invention and with the parts coupled together; and the view may be considered as taken from the plane 1—1 of Fig. 2.
Figure 2:
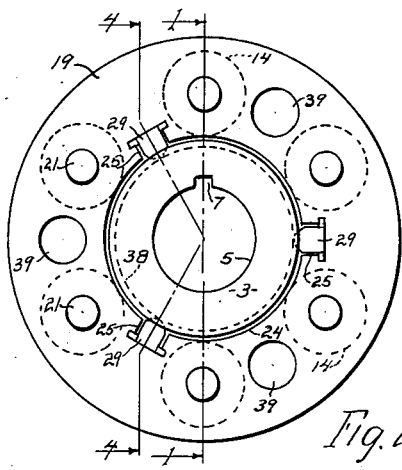
Fig. 2 is an end elevational view of the coupling of Fig. 1.

Referring to the drawing, Figs. 1 to 5, there is shown at 1 and 2 a pair of coupling parts, comprising respectively hubs 3—4, bored out as at 5—6 to fit on shafts or the like and having keyways 7—8 and threaded holes 9—10 for set screws, by which the hubs may be rigidly secured in a well known manner to the end portions of the shafts, shown in broken line at 11—12.

The coupling part 1 has a flange 13 integral with the hub 3, provided with a circular series of bushing bores 14—14. In the bushing bores are yieldable bushings 15—15 of rubber or like yieldable material; and in these bushings are tubular metal bushings 16—16 having pin bores 17—17 therein. The pin bores are all preferably of equal diameter and parallel and concentric with the axis of the hub.

The part 2 of the coupling is preferably identical with the part 1, as indicated by the same reference characters with the suffix A for some of the corresponding elements.

When the coupling parts 1 and 2 are secured to their respective shafts, each pin bore 17 of one part is alignable with the pin bore 17A of the other part, and coupling pins 18—18 in the pairs of aligned bores bridge the two parts and couple them together.

The construction of the coupling thus far described is well known as well as its mode of operation, in coupling the two shafts 11 and 12 together so that one can drive the other; and in yielding at the bushings 15—15 and 15A—15A.

However, in the embodiment of the present invention, the coupling pins 18—18 project axially out of the pin bores of the coupling parts, and are all connected to a pin carrier 19, in the form of a ring surrounding the hub 3. The connection in the form of the invention of Figs. 1 to 5, comprises a neck 20 on the pin, going through a hole in the carrier 19 and riveted over as at 21.

Figure 3:
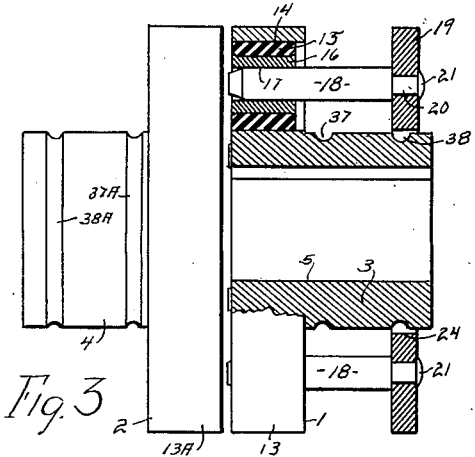
Fig. 3 is a view of the coupling device of Fig. 1 partly in longitudinal section and with the two parts of the coupling uncoupled.
Figure 4:
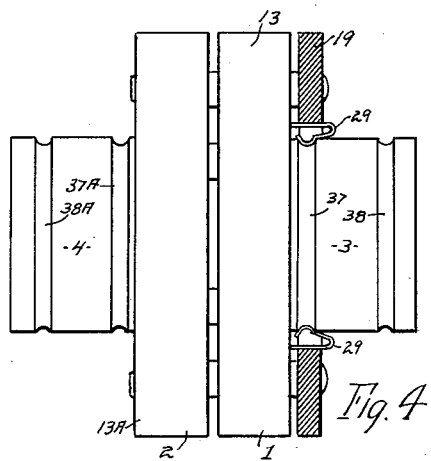
Fig. 4 is an elevational view of the coupling of Fig. 1 with a part thereof in cross section, and the cross section may be considered as taken from the plane 4—4 of Fig. 2.
Figure 5:
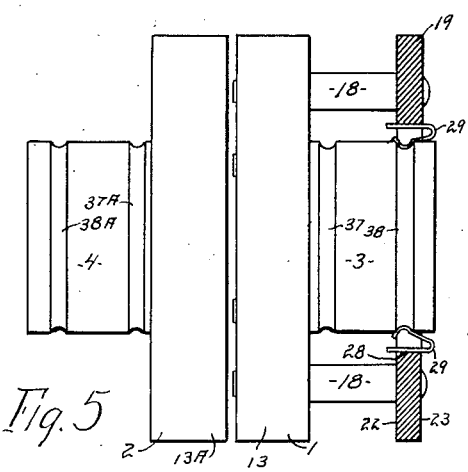
Fig. 5 is a view similar to Fig. 4 but with the parts of the coupling in uncoupled relation.

The assembly of pins 18—18 and ring 19 may be manually retracted or reciprocated bodily as a unit to withdraw the pins, until they clear the bushings 15A and flange 13A of the coupling part 2, as shown in Fig. 3 to uncouple the two coupling parts. Either shaft 11 or 12 and its attached coupling part may then be rotated independently of the other, or one may be removed away from the other, etc., for any purpose.

To recouple the parts, the pins are all reinserted in unison into the bushings of the coupling part 2 by return reciprocatory movement of the ring.

If desired, the pins 18 may be withdrawn also from the bushings in the flange 13, and the ring 19 and the pins may then be removed as a unit from the coupling as a whole.

It will be noted that after uncoupling as described there are no loose parts to be taken care of, nor reassembly of parts when recoupling; and that tools are not needed for either operation.

In some cases, it will be desirable to lock the ring 19 in coupled position or in uncoupled position or in both positions, to insure against its unwanted shifting in either reciprocatory direction. According to the invention a quick detachable spring clip device is provided to do this, which can be assembled into the coupling without bolts, rivets or other attaching devices.

The ring 19 has flat parallel faces 22—23 and has a central opening 24 closely surrounding but preferably spaced from the hub 3, and a number such as three U-form recesses or notches 25—25 are provided in the periphery of this opening, preferably rectangular and having straight parallel side walls 26 and 27 and a flat bottom wall 28.

Figures 6, 7, 8, 9, 10:
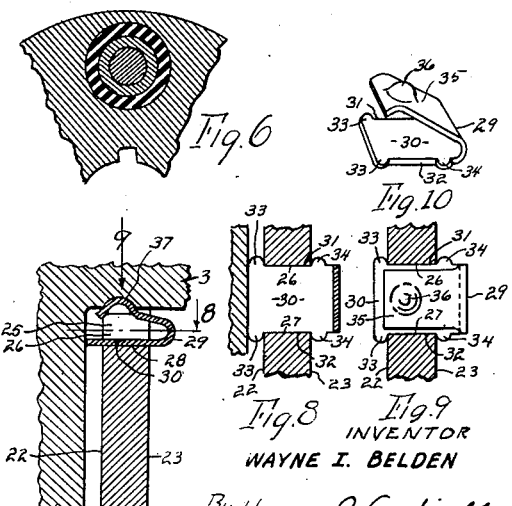
Fig. 6 is a fragmentary sectional view taken from the plane 6—6 of Fig. 1.
Fig. 7 is a fragmentary view to enlarged scale similar to a part of Fig. 4.
Fig. 8 is a sectional view from the plane 8 of Fig. 7.
Fig. 9 is a view taken in the direction of the arrow 9 of Fig. 7.
Fig. 10 is a view illustrating in perspective and separately, a clip device of Figs. 7 to 9.

A spring clip device 29 is provided for each recess made from resilient sheet metal and shown separately in perspective in Fig. 10. It comprises a generally rectangular flat base portion 30 and having parallel side edges 31—32 and ears or projections 33—33 and 34—34 at the ends of the side edges respectively. These parts are sized so that the side edges 31—32 will slide along the walls 26—27 of the recess until the base portion 30 rests upon the flat bottom 28 of the recess; and the projections 33—33 and 34—34 then hook over the faces 22 and 23 of the ring, so that so long as the base portion 30 is held upon the bottom 28 of the recess the device cannot be dislodged or displaced.

A resilient finger 35 extends upwardly in the recess from the base portion 30 at an angle and near its end has an upwardly convex dent 36 formed thereon.

The dent 36 is yieldably engaged with the hub 3 by the resilience of the finger 35 and the resilience reacts upon the base portion 30 and holds it as aforesaid upon the bottom 28 of the recess.

On the outer surfaces of the hub 3 is a pair of axially spaced annular grooves 37 and 38, so disposed that when the ring 19 and pins 18—18 are in the coupling position, the dents 36—36 of all of the spring devices 29, drop into the grooves 37; and when in the uncoupled position drop into the groove 38; the shoulders or side walls of the grooves yieldably retaining the dents in the grooves.

The fingers 35 as will be understood will yield and the dents 36 will ride up out of one groove and slide along on the hub from one position to the other and snap into the other groove when the ring 19 is manually and forcibly reciprocated for the purposes described, but will prevent unwanted movement of the ring from its groove-determined coupling and uncoupling positions. To facilitate manual movement of the ring, finger holes 39—39 may be provided therein, Fig. 2.

It is believed that it is apparent that the ring and pins may be presented to the pin bores from the other side of the coupling with the ring surrounding the hub 4 and that it will operate from that side in the manner described and to this end the hub 4 is provided with grooves 37A and 38A.

In a coupling of this general class, when the axes of the coupled shafts are parallel but not coincident, one being slightly offset radially from the other; or when their axes are slightly out of line, one making a slight angle with the other; the coupling pins, as they rotate around with the coupling, continuously shift or rock or nutate out of parallelism with each other in the yieldable bushings and take up average or compensating positions, adapting themselves to the misalignment of the shafts. When the present invention is embodied in couplings where such compensating action is wanted, it may be desirable to provide a yielding or lost motion or shifting connection between the coupling pins and the ring carrier, and three such arrangements are shown in Figs. 11, 12, and 13 respectively.

Figure 11:
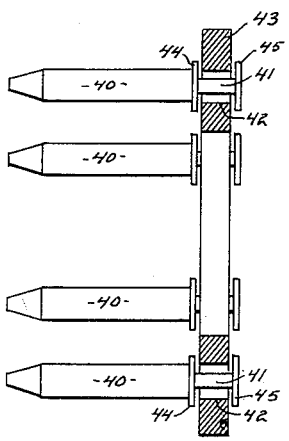
Figs. 11, 12 and 13 are views each illustrating a modification of a unitary coupling assembly, one form of which is shown in Fig. 1.

In the modification of Fig. 11, the coupling pins 40—40 are provided with reduced diameter necks 41, extending through holes 42 in the ring 43 which are larger than the necks, and flanges 44 and 45 are provided on the pins at each side of the ring and spaced therefrom.

It will be noted that in the first described form, the ring 19 is in effect carried by the pins, or carried by the metal bushings 16 into whose pin bores they are telescoped, there being clearance at 24 between the ring and the hub which it surrounds; and the thrusts of the several spring devices 29 being balanced or symmetrical. With the modification of Fig. 11, the pins 40 will be carried by the bushings and the ring 43 will be carried or supported on the hub by the spring clip devices. The ring 43 when reciprocated manually will engage the flange 44 or the flange 45 to push the pins into coupling position or to retract them therefrom, and when in the coupling position, the necks 41 and the flanges 44 and 45 will clear the ring as shown in Fig. 11, whereby the pins 40 in effecting the above said misalignment compensation, may rock or nutate or have hinging movement or radial movement relative to the ring.

Figure 12:
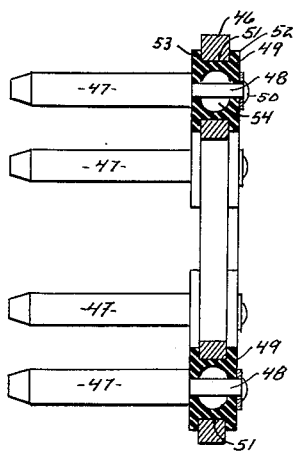
Figure 13:
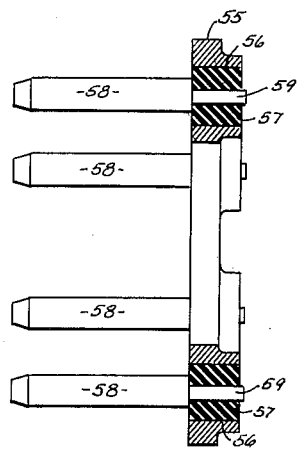

In the form of Fig. 12, the ring is shown at 46. Pins 47—47 have necks 48 projected through rubber or like cushioning devices 49 and riveted over as at 50 at the ends of the neck. The devices 49 are generally of spool form, the body of the spool being in a hole or bore 51 in the ring, and the flanges 52 and 53 of the spool lying on the inner and outer faces of the ring. The said movements of the pin with respect to the ring is thereby made possible, by the yielding character of the material of the spool, and to render it more yielding it may be hollowed out at its interior where it surrounds the neck 48, as at 54.

In the modification of Fig. 13, the ring 55 is provided with large diameter bores 56 of extended axial extent, and rubber or like yieldable bushings 57 are fitted therein and preferably vulcanized thereto, and the pins 58—58 have small diameter necks 59 projected into and preferably vulcanized to the bushings 57, whereby the said compensating movement of the pins 58 is provided for.

Means such as the clip devices 29 and the corresponding grooves 37—38 or other shoulders to position the pin carrier, are not in all cases necessary and can be omitted if desired; but it is preferred to use them for the purposes mentioned. And while the central opening 24 of the pin carrier, could if desired, be made to fit upon and slide upon the hub, that is unnecessary; and in fact the device as a whole operates better with clearance at 24 because then the ring and its pins are more free to take up positions in which, as aforesaid, the pins, by changing position during rotation, compensate for misalignment of the coupled shafts.

The carrier and its pins constitute in themselves an assembly which as a unit is a part of the invention, inasmuch as a two part coupling of this class can be changed to one which is couplable and uncouplable by applying this unit assembly to it.

Figure 14:
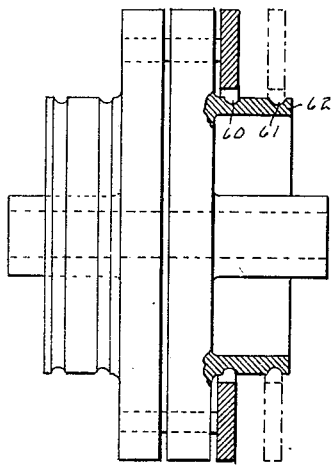
Fig. 14 is a view of a coupling device similar to that of Fig. 1 but illustrating a modification.

It is not essential, when the said annular grooves and spring clips are employed to position the ring, that the grooves be provided on the hub. They may as shown for the grooves 60 and 61 in Fig. 14 be provided on a tubular extension 62 on the coupling part, particularly in large diameter couplings.

I claim:

1. A flexible coupling for coupling and uncoupling the adjacent, confronting, spaced apart end portions of a driving and a driven rotary shaft that are out of axial alignment and yieldable flexibly to compensate for said axial misalignment of the shafts during rotation, the coupling comprising a pair of coupling parts having each a flange and provided with means for rigidly attaching the flanges respectively to the respective shafts to be coupled, with the flanges transversely of the shafts and adjacent to each other; each flange supporting a series of bushings of rubber or like yieldable material in a series around the axis of the shaft to which the flange is attached; metal tubular liners in the bushings; the liner of each bushing on one flange normally axially aligned with a liner of the other flange, and the axes of all of the liners being normally parallel to the shaft axes; pins slidingly fitting within the aligned bushing liners; all of the pins being connected at one end to a carrier element surrounding the axis of one of the shafts; the pins and carrier element being reciprocable axially in unison to slide the pins in the metal liners to bridge the flanges and couple them and to unbridge and uncouple them, and the pins mounted on the carrier by means permitting universal hinging movement.

2. A flexible coupling for coupling and uncoupling the adjacent, confronting, spaced apart end portions of a driving and a driven rotary shaft that are out of axial alignment and yieldable flexibly to compensate for said axial misalignment of the shafts during rotation, the coupling comprising a pair of coupling parts having each a flange and provided with means for rigidly attaching the flanges respectively to the respective shafts to be coupled, with the flanges transversely of the shafts and adjacent to each other; each flange supporting a series of bushings of rubber or like yieldable material in a series around the axis of the shaft to which the flange is attached; metal tubular liners in the bushings; the liner of each bushing on one flange normally axially aligned with a liner of the other flange, and the axes of all of the liners being normally parallel to the shaft axes; pins slidingly fitting within the aligned bushing liners; all of the pins being connected at one end to a carrier element surrounding the axis of one of the shafts; the pins and carrier element being reciprocable axially in unison to slide the pins in the metal liners to bridge the flanges and couple them and to unbridge and uncouple them; the connection of the pins to the carrier element comprising means to permit the pins to move with universal hinging movement relative to the carrier element, in response to rotation of the axially misaligned shafts.

3. A flexible coupling for coupling and uncoupling the adjacent, confronting, spaced apart end portions of a driving and a driven rotary shaft that are out of axial alignment and yieldable flexibly to compensate for said axial misalignment of the shafts during rotation, the coupling comprising a pair of coupling parts having each a flange and provided with means for rigidly attaching the flanges respectively to the respective shafts to be coupled, with the flanges transversely of the shafts and adjacent to each other; each flange supporting a series of bushings of rubber or like yieldable material in a series around the axis of the shaft to which the flange is attached; metal tubular liners in the bushings; the liner of each bushing on one flange normally axially aligned with a liner of the other flange, and the axes of all of the liners being normally parallel to the shaft axes; pins slidingly fitting within the aligned bushing liners; all of the pins being connected at one end to a carrier element surrounding the axis of one of the shafts; the pins and carrier element being reciprocable axially in unison to slide the pins in the metal liners to bridge the flanges and couple them and to unbridge and uncouple them; the connection of the pins to the carrier element comprising means to permit the pins to move with universal hinging movement and radial movement relative to the carrier element, in response to rotation of the axially misaligned shafts.

4. A flexible coupling for coupling and uncoupling the adjacent, confronting, spaced apart end portions of a driving and a driven rotary shaft that are out of axial alignment and yieldable flexibly to compensate for said axial misalignment of the shafts during rotation, the coupling comprising a pair of coupling parts having each a flange and provided with means for rigidly attaching the flanges respectively to the respective shafts to be coupled, with the flanges transversely of the shafts and adjacent to each other; each flange supporting a series of bushings of rubber or like yieldable material in a series around the axis of the shaft to which the flange is attached; metal tubular liners in the bushings; the liner of each bushing on one flange normally axially aligned with a liner of the other flange, and the axes of all of the liners being normally parallel to the shaft axes; pins slidingly fitting within the aligned bushing liners; all of the pins being connected at one end to a carrier element surrounding the axis of one of the shafts; the pins and carrier element being reciprocable axially in unison to slide the pins in the metal liners to bridge the flanges and couple them and to unbridge and uncouple them; the connection of the pins to the carrier element comprising means to permit the pins to move with universal hinging movement and radial movement relative to the carrier element in response to rotation of the axially misaligned shafts; said means comprising bodies of rubber or like yieldable material, one for each pin mounted on the carrier element and the pin having an end portion projected into the body and supported thereby.

5. A flexible coupling for coupling and uncoupling the adjacent, confronting, spaced apart end portions of a driving and a driven rotary shaft that are out of axial alignment and yieldable flexibly to compensate for said axial misalignment of the shafts during rotation, the coupling comprising a pair of coupling parts having each a flange and provided with means for rigidly attaching the flanges respectively to the respective shafts to be coupled, with the flanges transversely of the shafts and adjacent to each other; each flange supporting a series of bushings of rubber or like yieldable material in a series around the axis of the shaft to which the flange is attached; metal tubular liners in the bushings; the liner of each bushing on one flange normally axially aligned with a liner of the other flange, and the axes of all of the liners being normally parallel to the shaft axes; pins slidingly fitting within the aligned bushing liners; all of the pins being connected at one end to a carrier element surrounding the axis of one of the shafts and mounted by means permitting universal hinging movement thereon, the pins and carrier element being reciprocable axially in unison to slide the pins in the metal liners to bridge the flanges and couple them and to unbridge and uncouple them; and yieldable means reacting on the carrier and a portion of one of the coupling parts yieldably holding the carrier and the pins in coupling bridging positions.

6. A flexible coupling for coupling and uncoupling the adjacent, confronting, spaced apart end portions of a driving and a driven rotary shaft that are out of axial alignment and yieldable flexibly to compensate for said axial misalignment of the shafts during rotation, the coupling comprising a pair of coupling parts having each a flange and provided with means for rigidly attaching the flanges respectively to the respective shafts to be coupled, with the flanges transversely of the shaft and adjacent to each other; each flange supporting a series of bushings of rubber or like yieldable material in a series around the axis of the shaft to which the flange is attached; metal tubular liners in the bushings; the liner of each bushing on one flange normally axially aligned with a liner of the other flange, and the axes of all of the liners being normally parallel to the shaft axes; pins slidingly fitting within the aligned bushing liners; all of the pins being connected at one end to a carrier element surrounding the axis of one of the shafts; the pins and carrier element being reciprocable axially in unison to slide the pins in the metal liners to bridge the flanges and couple them and to unbridge and uncouple them; the connection of the pins to the carrier element comprising means to permit the pins to move with universal hinging movement and radial movement relative to the carrier element in response to rotation of the axially misaligned shafts; and yieldable means reacting on the carrier and a portion of one of the coupling parts yieldably holding the carrier and the pins in coupling bridging positions.

7. A flexible coupling for coupling and uncoupling the adjacent, confronting, spaced apart end portions of a driving and a driven rotary shaft that are out of axial alignment and yieldable flexibly to compensate for said axial misalignment of the shafts during rotation, the coupling comprising a pair of coupling parts having each a flange and provided with means for rigidly attaching the flanges respectively to the respective shafts to be coupled, with the flanges transversely of the shafts and adjacent to each other; each flange supporting a series of bushings of rubber or like yieldable material in a series around the axis of the shaft to which the flange is attached; metal tubular liners in the bushings; the liner of each bushing on one flange normally axially aligned with a liner of the other flange, and the axes of all of the liners being normally parallel to the shaft axes; pins slidingly fitting within the aligned bushing liners; all of the pins being connected at one end to a carrier element surrounding the axis of one of the shafts; the pins and carrier element being reciprocable axially in unison to slide the pins in the metal liners to bridge the flanges and couple them and to unbridge and uncouple them; and yieldable means reacting on the carrier and a portion of one of the coupling parts yieldably holding the carrier and the pins in coupling bridging positions; and the connection of the pins to the carrier element being a lost-motion connection to permit the pins to move relative to the carrier element into and out of parallelism with each other, in response to rotation of the axially misaligned shafts.

WAYNE I. BELDEN.

REFERENCES CITED

The following references are of record in the file of this patent:

UNITED STATES PATENTS

| Number | Name | Date |
| --- | --- | --- |
| 796,205 | Graham et al. | Aug. 1, 1905 |
| 1,210,969 | Niedergesaess | Jan. 2, 1917 |
| 1,730,362 | Gaylord | Oct. 8, 1929 |
| 1,753,300 | Peterson | Apr. 8, 1930 |
| 1,929,782 | Hughes | Oct. 10, 1933 |
| 2,167,705 | Batten | Aug. 1, 1939 |
| 2,189,598 | Brecht | Feb. 6, 1940 |
| 2,253,431 | Johansen | Aug. 19, 1941 |

FOREIGN PATENTS

| Number | Country | Date |
| --- | --- | --- |
| 839,770 | France | Jan. 7, 1939 |
| 360,513 | Germany | 1922 |